(12) United States Patent
Lenz

(10) Patent No.: US 12,159,280 B1
(45) Date of Patent: Dec. 3, 2024

(54) BLOCKCHAIN FACILITATION OF ASSET TRANSFERS BETWEEN COMPUTING SYSTEMS

(71) Applicant: Wells Fargo Bank, N.A., San Francisco, CA (US)

(72) Inventor: Jimmie Harold Lenz, Isle of Palms, SC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1198 days.

(21) Appl. No.: 16/214,686

(22) Filed: Dec. 10, 2018

Related U.S. Application Data

(60) Provisional application No. 62/611,889, filed on Dec. 29, 2017.

(51) Int. Cl.
  *G06Q 20/38* (2012.01)
  *G06Q 20/24* (2012.01)
  (Continued)

(52) U.S. Cl.
  CPC ........... *G06Q 20/389* (2013.01); *G06Q 20/24* (2013.01); *G06Q 20/3829* (2013.01); *H04L 9/14* (2013.01);
  (Continued)

(58) Field of Classification Search
  CPC .................................................. G06Q 20/389
  See application file for complete search history.

(56) References Cited

U.S. PATENT DOCUMENTS 11,055,707 B2 * 7/2021 Lingappa ............. G06Q 20/065
2002/0069148 A1 * 6/2002 Mutschler .............. G06Q 40/00
  705/35

(Continued)

OTHER PUBLICATIONS

"Decentralized System for Securitizing Collateral Debt Obligations Using the Ethereum Blockchain", _ETHeREAL_, [Online]. Retrieved from the Internet: URL: https: forum.ethereum.org discussion 2989 decentralized-system-for-securitizing-collateral-debt-obligations-using-the-ethereum-blockchain, (Aug. 2015), 4 pgs.
(Continued)

*Primary Examiner* — Mohammad A. Nilforoush
*Assistant Examiner* — Zehra Raza
(74) *Attorney, Agent, or Firm* — SCHWEGMAN LUNDBERG & WOESSNER, P.A.

(57) ABSTRACT

A method may include receiving at a receiving system an electronic request to transfer assets, included in an account of a user at a delivering system, to the receiving system; generating an electronic transaction record, the electronic transaction record identifying the user, the assets, and transfer information related to the assets; adding the electronic transaction record to a shared ledger data structure; in response to the adding: transmitting an indication to the delivering system that the electronic transaction record was added; and transmitting a notification to computing nodes associated with the shared ledger data structure that the shared ledger data structure was updated; after transmitting the indication, receiving confirmation from a third-party system that the assets were successfully transferred; and in response to the confirmation, updating an account database at the receiving system indicating a transfer of the assets.

12 Claims, 5 Drawing Sheets

(51) Int. Cl.
*H04L 9/06* (2006.01)
*H04L 9/14* (2006.01)
*H04L 9/32* (2006.01)
*H04L 9/40* (2022.01)

(52) U.S. Cl.
CPC ........ *G06Q 2220/00* (2013.01); *H04L 9/0643* (2013.01); *H04L 9/3236* (2013.01); *H04L 63/0428* (2013.01); *H04L 63/166* (2013.01); *H04L 63/168* (2013.01)

(56) References Cited

U.S. PATENT DOCUMENTS

| | | | |
|---|---|---|---|
| 2003/0130916 A1* | 7/2003 | Block | G06Q 40/02 705/35 |
| 2008/0015982 A1* | 1/2008 | Sokolic | G06Q 20/10 705/39 |
| 2016/0203572 A1 | 7/2016 | McConaghy et al. | |
| 2016/0217436 A1 | 7/2016 | Brama | |
| 2016/0261685 A1 | 9/2016 | Chen et al. | |
| 2016/0292672 A1 | 10/2016 | Fay et al. | |
| 2016/0292680 A1 | 10/2016 | Wilson, Jr. et al. | |
| 2016/0330034 A1 | 11/2016 | Back et al. | |
| 2016/0342977 A1 | 11/2016 | Lam | |
| 2016/0364700 A1 | 12/2016 | Chenard et al. | |
| 2017/0005804 A1* | 1/2017 | Zinder | H04L 9/3239 |
| 2017/0011460 A1 | 1/2017 | Molinari et al. | |
| 2017/0046526 A1 | 2/2017 | Chan et al. | |
| 2018/0191503 A1* | 7/2018 | Alwar | H04L 9/14 |
| 2019/0289019 A1* | 9/2019 | Thekadath | G06F 16/27 |

OTHER PUBLICATIONS

Dhar, Suparna, "Can blockchain address non-performing loan-related issues in the Indian banking system", Asian Management Insights vol. 3 Issue 2; Social Space 2016 17: The Social Finance Issue, 4 pgs.

\* cited by examiner

BLOCKCHAIN FACILITATION OF ASSET TRANSFERS BETWEEN COMPUTING SYSTEMS

CROSS-REFERENCES TO RELATED APPLICATIONS

This patent application claims the benefit of U.S. Provisional Patent Application No. 62/611,889, filed Dec. 29, 2017, which is incorporated by reference herein in its entirety.

TECHNICAL FIELD

Embodiments described herein generally relate to shared data ledgers and in particular, but without limitation, to blockchain facilitation of asset transfers between computing systems.

BACKGROUND

A user may have a brokerage account with a company that includes a number of different assets. Sometimes, the user may take out a loan using the assets as collateral. Additionally, the user may want to transfer the assets to a different brokerage firm ("receiving company") from their existing firm ("delivering company"). Traditionally, the transfer would occur through a manual, hand-shake style deal back-and-forth process between the two companies. To deal with the loan secured by the assets the "receiving" company may give an unsecured loan to the delivery company until the assets are transferred, which often takes weeks. Alternatively, the assets could be transferred with the loan being paid off after the transfer. Until the transfer is complete, there is a risk of a substantial change in value in the assets which may leave the lender with insufficient collateral to secure the loan.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

In view of the above problems described in the Background, a technical solution is described herein. The solution is not merely a computerized version of what has traditionally occurred manually, but instead is a new process leveraging nascent technologies (e.g., blockchains) to lower the risk for all parties and to improve upon computing-based asset management systems. To this end, the process described is not one that could be done in a person's mind or with a pen and paper. As discussed further herein, an electronic shared data structure may be used to facilitate the transfer of assets between two computing systems (e.g., a delivering system and a receiving system).

Figure 1:
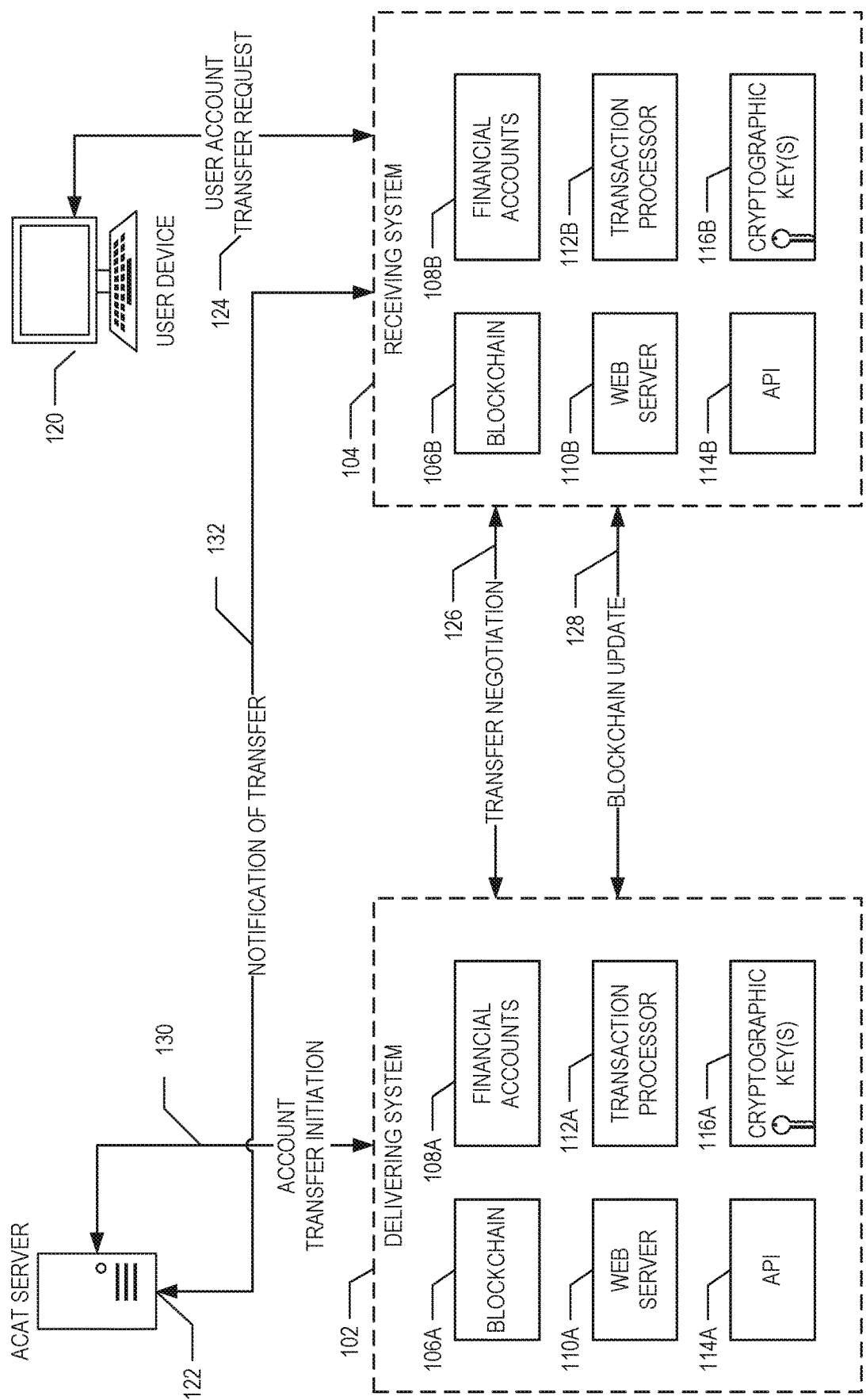
FIG. 1 illustrates a schematic representation of a transfer between a delivering system and a receiving system, according to various examples.

FIG. 1 illustrates a schematic representation of a transfer between a delivering system and a receiving system, according to various examples. FIG. 1 includes delivering system 102 and receiving system 104. Delivering system 102 and receiving system 104 may be computing systems of financial institutions that manage assets for a user. The computing systems may include one or more front-end or back-end computing devices (not shown). This disclosure describes a number of actions that these computing systems may perform. The performance may occur on a single device or multiple devices and in a single location or across multiple locations.

In an example, delivering system 102 includes blockchain 106A, financial accounts 108A, web server 110A, transaction processor 112A, API 114A, and cryptographic keys 116A. Receiving system 104 includes corresponding blockchain 106B, financial accounts 108B, web server 110B, transaction processor 112B, API 114B, and cryptographic keys 116B. As used in this disclosure, delivering system 102 may be the financial institution that currently has an account of a user, and receiving system 104 is the financial institution that the user wishes to transfer their account to.

Furthermore, for illustration purposes, delivering system 102 and receiving system 104 are illustrated as a set of separate components. However, the functionality of individual components may be performed by a single component. A component may represent computer program code that is executable by a processing unit (e.g., a core of a general-purpose computer processor, a graphical processing unit, an application specific integrated circuit, etc.) The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure.

Similarly, data used in the delivering system 102 and receiving system 104 may be organized and stored in a variety of manners. For convenience, the organized collection of data is described herein a being stored in a database (s). Receiving system 104 and delivering system 102 may have different databases that store financial accounts 108B and financial accounts 108A, respectively. The specific storage layout and model used in the databases may take a number of forms. A database may be, but is not limited to, a relational database (e.g., SQL), non-relational database (NoSQL) a flat file database, object model, document details model, or a file system hierarchy. A database may store data on one or more storage devices (e.g., a hard disk, random access memory (RAM), etc.). The storage devices may be in standalone arrays, part of one or more servers, and may be located in one or more geographic areas.

In various examples, the components of FIG. 1 may communicate via one or more networks. A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

Delivering system 102 and receiving system 104 include financial accounts 108A and financial accounts 108B, respectively (together, financial accounts 108). Financial accounts 108 may store data on the assets of users managed by a company. As a continuing example, consider that a user "Alice" has an account at delivering system 102 and is planning on transferring the account to receiving system 104—for example, if Alice's agent is switching to receiving system 104 as well.

Information about the account may be stored in financial accounts 108A and may include asset details (e.g., amount of each asset, when purchased, etc.). The information may also include details on any loans that use asset(s) of Alice as collateral and personal information of Alice (e.g., legal name, social security number, etc.). Loan details may include the type of loan (e.g., margin loan, non-purpose loan), interest rate, balance, pay-off period, among other details. In an example, assets that are used as collateral for a loan are considered associated with the loan. An entry in a database storing financial accounts 108A may include a loan identifier and identifiers of the assets used as collateral.

Web servers 110A, B may be used to exchange information with users via a network such as the Internet. Although generally discussed in the context of delivering webpages via the Hypertext Transfer Protocol (HTTP), other network protocols may be utilized by web servers 110 (e.g., File Transfer Protocol, Telnet, Secure Shell, etc.) A user may enter in a uniform resource identifier (URI) into a network browser (e.g., the INTERNET EXPLORER® web browser by Microsoft Corporation or SAFARI® web browser by Apple Inc.) that corresponds to the logical location (e.g., an Internet Protocol address) of web server 110B. In response, web server 110B may transmit a web page that is rendered on a display device of user device 120 (e.g., a mobile phone, desktop computer, etc.).

Web server 110B may host a web-based application that facilitates transfer from delivering system 102 to receiving system 104. In other examples, delivering system 102 may host the application. Other application types may also be used such as standalone applications. The web-based application may include input fields for user information (e.g., name, social security number) and account details (e.g., account numbers of assets to transfer, loan information, etc.). Transaction processor 112B may then use the entered information to begin a communication session with delivering system 102.

An Application Programming Interface (API) provides a method for computing processes to exchange data. A web-based API, such as APIs 114, may permit communications delivering system 102 and receiving system 104—either between each other or with Automated Customer Account Transfer Server (ACAT) 122 and user device 120. APIs 114 may define a set of HTTP calls according to Representational State Transfer (RESTful) practices.

A RESTful API may define various GET, PUT, POST, DELETE methods at URI endpoint to create, replace, update, and delete data stored on a computing device (e.g., financial accounts 108A). For example, "GET /status/loanid" may be used to retrieve loan information for the identification indicated by "loanid" stored in financial accounts 108A. The same endpoint may be reused to indicate a transfer status the loan using "PUT /status/loanid" with a packet payload indicating the change in status. APIs 114 may transmit responses to requests for data according to the JavaScript Object Notation (JSON) format. For example, data transmitted via API 114A to receiving system 104 (or vice-versa) may be encoded in the JSON format and submitted in the content portion of a PUT request to update the transferred status of an account.

Because of the sensitive nature of data stored within delivering system 102 and receiving system 104, various security measures may be used to protect data at rest and in transit. For example, APIs 114A, B may use tokens or API keys (e.g., as stored in cryptographic keys 116A, B) to ensure only authorized parties may retrieve or update data. Additionally, data transmitted over the network may use a cryptographic protocol, such Secure Socket Layer (SSL) or Transport Layer Security (TLS). As a further security precaution, the transmitted data itself may be encrypted, separately from the SSL or TLS encryption. Public-key infrastructure (PKI) may be leveraged for SSL/TLS, as well as for the separate data encryption.

Continuing the Alice example, transaction processor 112B may initiate a communication session (e.g., transfer negotiation 126) with receiving system 104 to retrieve asset and loan details according to information received in user account transfer request 124. The received information may be used to generate an electronic transaction record that ultimately is added to a shared data ledger (e.g., a blockchain) as discussed in more detail with respect to FIG. 2. The electronic transaction record may include the details of the transfer such an identification of the delivering system 102 and receiving system 104, personal details of Alice, and the relevant asset and loan information.

After the electronic transaction record is added to a shared data ledger, receiving system 104 may communicate confirmation (e.g., blockchain update 128) of the same to delivering system 102. Upon verifying that blockchain 106A includes the electronic transaction record as agreed upon during transfer negotiation 126, delivering system 102 may communicate account transfer initiation 130 to ACAT server 122. In an example, ACAT server 122 maintains a record (e.g., database) of which broker-dealer (e.g., delivering system 102 or receiving system 104) is responsible for a customer's account. Accordingly, after receiving account transfer initiation 130—which may include a customer name's and social security number among other things-ACAT server 122 may update its records and transmit notification of transfer 132 to receiving system 104.

Figure 2:
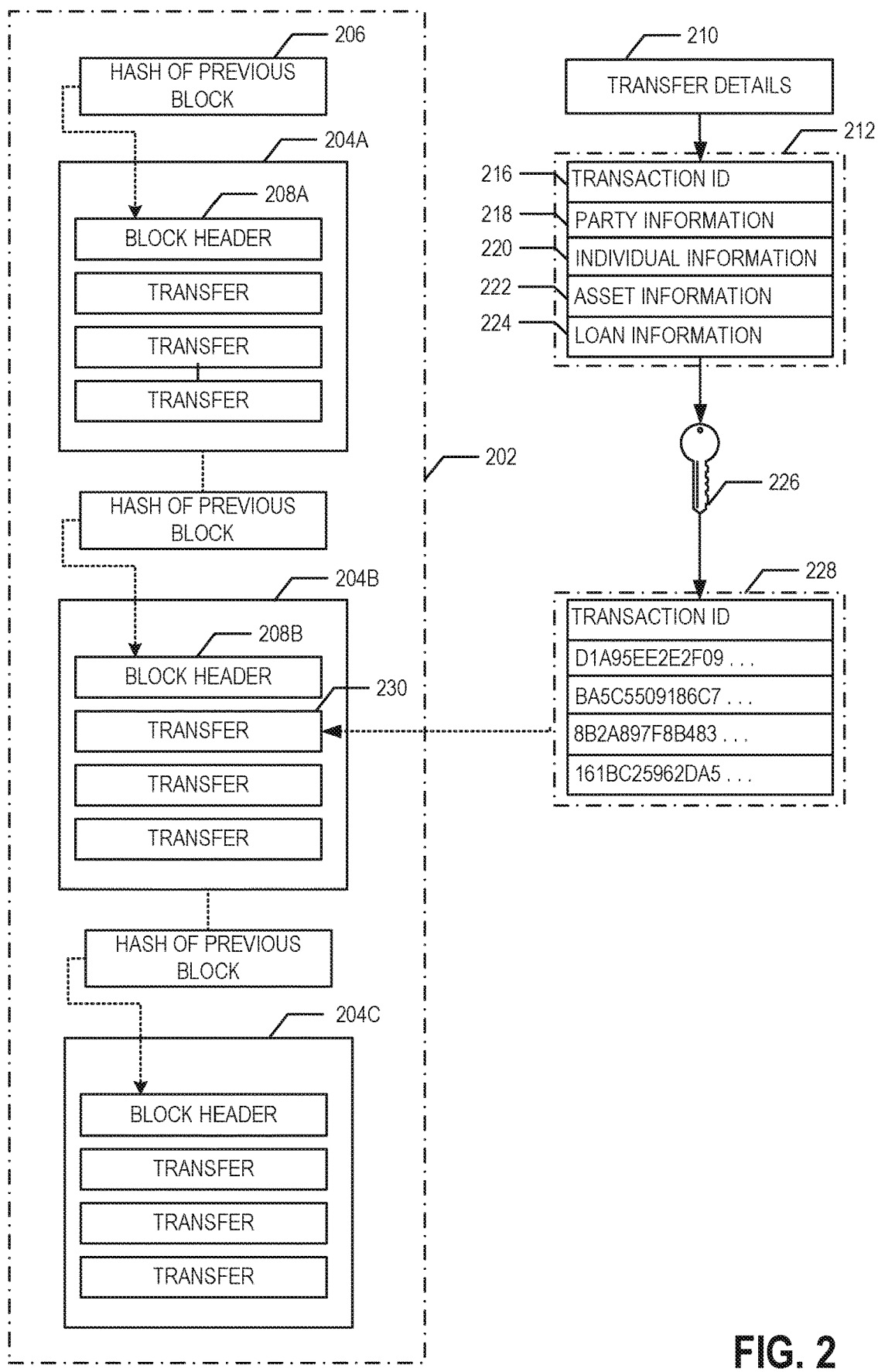
FIG. 2 illustrates a blockchain data structure, according to various examples.

FIG. 2 illustrates a blockchain 202 data structure, according to various examples. Blockchain 202 includes a series of blocks 204A, 204B, 204C with block headers 208A, 208B. FIG. 2 further illustrates transfer details 210 and clear details 212 that include transaction ID 216, party information 218, individual information 220, asset information 222, and loan information 224. Encrypted details 228 are illustrated as an encrypted (e.g., using cryptographic key 226) version of some of the information in clear details 212.

The use of the phrase blockchain technology or blockchain generally means a collection of programming paradigms permitting a shared ledger of data that is not alterable without detection once the data has been added to the ledger. One of the most common uses of blockchains is the Bitcoin cryptocurrency. The Bitcoin blockchain uses Merkel trees, cryptocurrency as reward for calculating a "proof of work," decentralized control, and consensus computing. However, these are not required for a blockchain to exist.

In a basic form, a blockchain may be conceptualized as series of data blocks (e.g., blocks 204A . . . . C), each data block including one or more data entries. For example, account transfers (e.g., transfer 230) may be stored as data entries and grouped together in a block, with each block having a unique identifier. The unique identifier may be a sequence identifier (e.g., the tenth block has an identifier of "10"). Each data entry may have a timestamp as well, so the order of the transactions may be determined. The next block in the chain may include a hash of the data entries in the previous block. Thus, if a malicious actor wanted to alter information in an earlier added block, it would be easily detected because the hashes in later blocks will no longer match.

Different organizations may use different types of blockchains. Generally speaking there are two types of blockchains: public and private. While the precise definitions of these terms may vary, they generally include variants of the following.

For example, a public, non-permissioned blockchain is one in which anyone may read or may request transactions be added to the blockchain. This type of blockchain generally includes no centralized management due to its open nature. The Bitcoin blockchain is an example of a public, non-permissioned blockchain. Another feature often associated with public, non-permission blockchains is anonymity—although there is no requirement that transactions on a public, non-permissioned block remain anonymous.

A private, non-permissioned blockchain may be a blockchain in which write access to the blockchain is limited to a set of computers, such as those within an organization. However, because the blockchain is non-permissioned, anyone may request that data be added to the blockchain—the data however should still be added by a limited set of computers. Accordingly, trust issues that arise in public blockchains may be avoided with respect to fraudulent attempts at manipulation because limited set of computers should have been prescreened as non-malicious.

Permissioned blockchain variants of the above may limit user's read/write access to a blockchain. For example, a permissioned public blockchain may allow anyone to read the blockchain, but restrict write access to a limited set of users. When computing a block, a computing device may check for credentials (e.g., an access code, or username and password combination) before permitting data to be added to the blockchain. Similar restrictions may be used for private blockchains.

The access rights may also be established using encryption. In other words, in a public blockchain all the data may be public, but be encrypted. Thus, in order for and entity to read the data, it would have to possess a decryption key. Different types of encryption may be used, as one of ordinary skill in the art would recognize.

In various examples herein, blockchain 202 is a private blockchain with read/write access restricted to those entities that may manage a financial account of a user (e.g., delivering system 102 and receiving system 104 type entities). In some examples, a copy of blockchain 202 is maintained at each entity (e.g., blockchain 106A and blockchain 106B). Updates made to any local version of the blockchain may be transmitted to other entities that store the blockchain for verification (e.g., recalculating the hashes). In order to not have conflicting blockchains, an entity may always add on to the longest verified blockchain. In some examples, a subset of the entities may manage the blockchain and respond to requests from other entities for data retrieval from blockchain 202. In some examples, a single entity may be trusted by all other entities to manage the blockchain.

Returning to the Alice example, consider that delivering system 102 and receiving system 104 have successfully determined all the relevant details to initiate the transfer (e.g., transfer details 210). An electronic transaction record may be created based on transfer details 210. Initially, the electronic transaction record may be stored in clear text (e.g., not encrypted) such as in clear details 212.

A unique identification may be generated as part of transfer details 210 to identify the transfer (e.g., transaction ID 216). Party information 218 may identify delivering system 102 and receiving system 104 as the parties that are effecting the transfer. Individual information 220 may include personally identifiable information of Alice (e.g., full legal name, social security number). Asset information 222 may identify the assets (e.g., equities, bonds, etc.) and amount held of each asset. Loan information 224 may identify one or more loans, their respective balances, and assets being used as collateral. A predefined format may be used for the electronic transaction record (e.g., semicolon delineation, order of information, etc.). The order in clear details 212 is for illustration purposes. Additionally, more or fewer items of information may be stored in the record without departing from the scope of this disclosure.

Receiving system 104 may then encrypt all of part of the information in the generated electronic transaction record. Encrypting may include retrieving a cryptographic key from a plurality of keys. The selected key may be based on the identity of the receiving system or a combination of the identity of the receiving system and delivering system. For example, a symmetrical key may be stored for each company pair. A symmetrical key may be the same for each party in the pair. In contrast, if public-key infrastructure (PKI) is used, the public key of the delivering system 102 may be used to encrypt the data. Delivering system 102 may use the corresponding private key to decrypt the information. In either case, receiving system 104 may sign the data using another key (e.g., the private key of receiving system 104).

Figure 3:
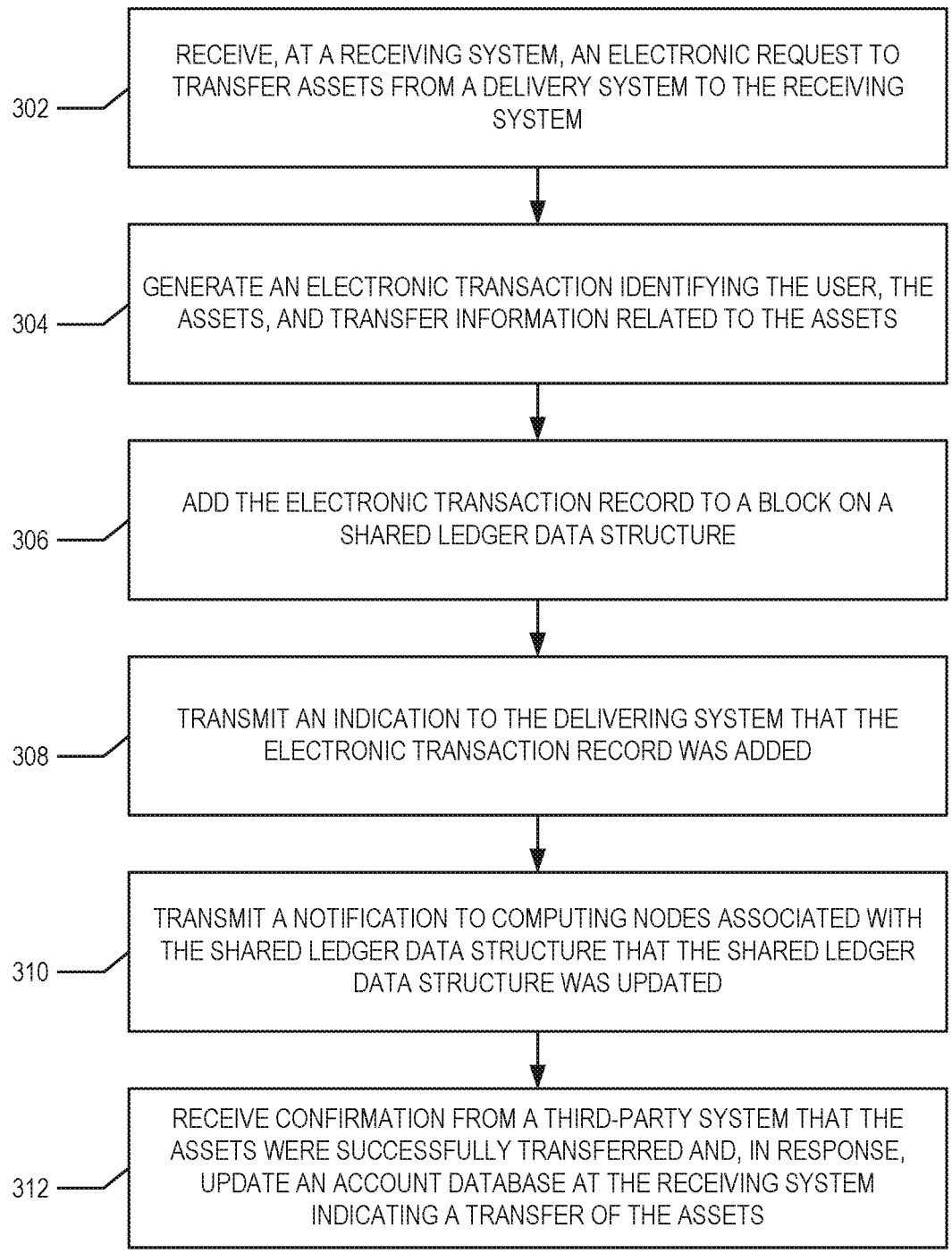
FIG. 3 is a flowchart illustrating a method of updating a shared ledger data structure, according to various examples.

FIG. 3 is a flowchart illustrating a method of updating a shared ledger data structure, according to various examples. The method may be embodied in a set of instructions stored in at least one non-transitory storage device of a computing device(s). The computing device(s) may have one or more processors that execute the set of instructions to configure the one or more processors to perform the operations illustrated in FIG. 3. To this end, the one or more processors may instruct other parts of the computing device to carry out the set of instructions. For example, the computing device may instruct a network device to transmit data to another computing device or the computing device may provide data over a display interface to present a user interface. In some example, performance of the method may be split across multiple computing devices.

At operation 302, in an example, an electronic request is received at a receiving system to transfer assets, included in an account of a user at a delivering system, to the receiving system. For example, a user may be fill out an electronic form presented on a display device. The form may include fields for the user's name, account identification information, assets held in the account, and the identity of an entity to transfer to the account.

At operation 304, in an example, an electronic transaction record may be generated. The record may be based on information received as part of the request. For example, the electronic transaction record may identify the user, the assets, and transfer information related to the assets. The transfer information may identify a first entity (e.g., the receiving system) and a second entity (the delivering system).

At operation 306, in an example, the electronic transaction record may be added to a shared ledger data structure. The shared ledger data structure may be a blockchain data structure and adding the electronic transaction record to a shared ledger data structure may include adding the electronic transaction record to a block of the blockchain.

To add the block, all or some of the information in the electronic transaction record may be encrypted using a cryptographic key. The key may be selected from a plurality of keys and selected based on the identities of the first and second entity. Adding the block may include hashing the contents of the block. A header of the block may include a hash of the previous blocks in the blockchain.

In response to the adding, at operation 308, an indication may be transmitted to the delivering system that the electronic transaction record was added. The notification may include a block identification number of the block that was added.

At operation 310, in an example, a notification may be transmitted to computing nodes associated with the shared ledger data structure that the shared ledger data structure was updated. For example, a notification may be sent to other nodes that maintain a copy of the blockchain with the new block. The nodes may verify the block add it to their respective blockchains. In some examples, adding the block may be performed by a node other than the receiving system.

At operation 312, in an example, after transmitting the indication, confirmation may be received from a third-party system that the assets were successfully transferred. The third-party system may be an ACAT system. In response to the confirmation, an account database may be updated at the receiving system indicating a transfer of the assets to the receiving system.

Figure 4:
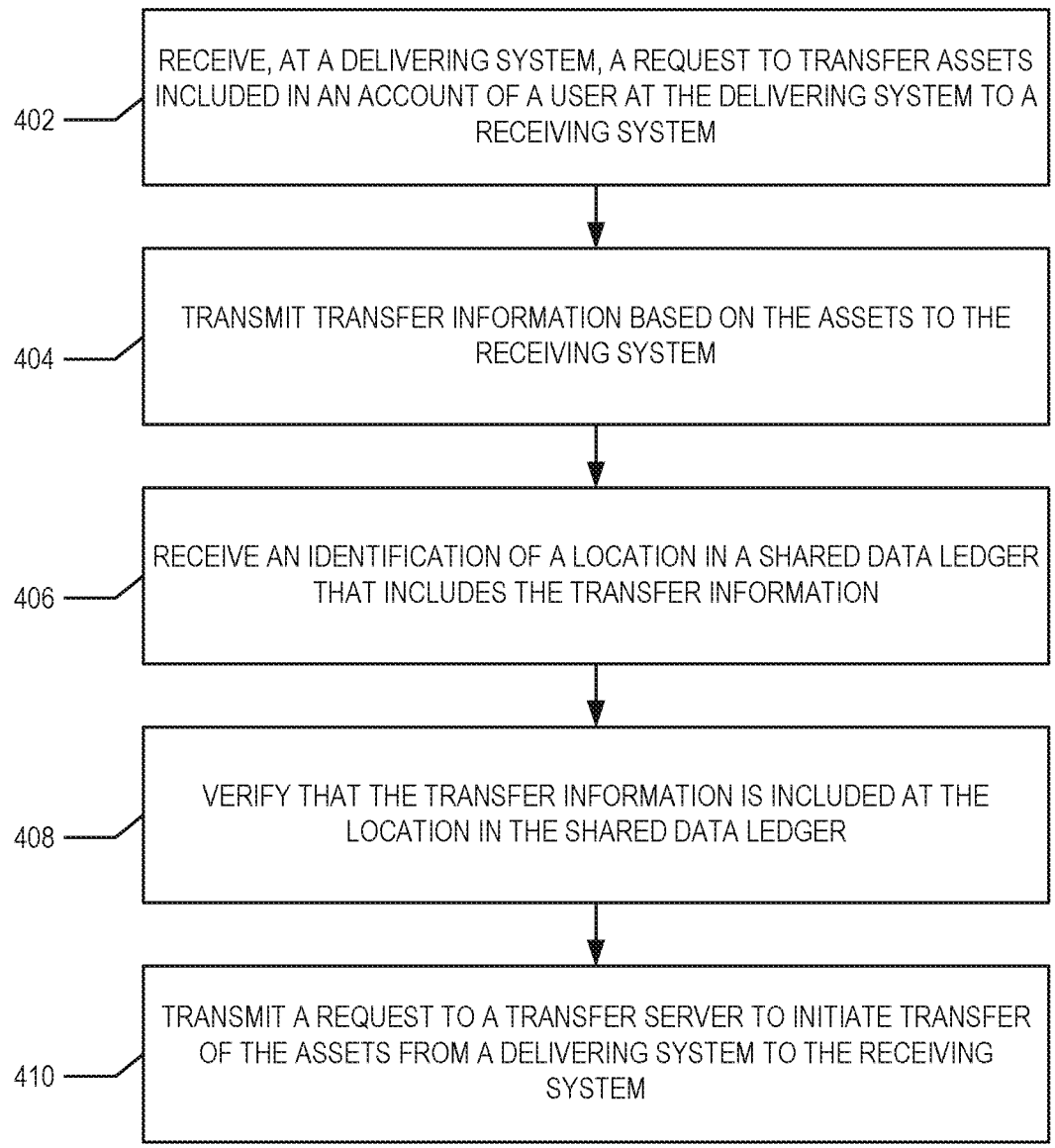
FIG. 4 is a flowchart illustrating a method of verifying transfer information in a shared data ledger, according to various examples.

FIG. 4 is a flowchart illustrating a method of verifying transfer information in a shared data ledger, according to various examples. The method may be embodied in a set of instructions stored in at least one non-transitory storage device of a computing device(s). The computing device(s) may have one or more processors that execute the set of instructions to configure the one or more processors to perform the operations illustrated in FIG. 4. To this end, the one or more processors may instruct other parts of the computing device to carry out the set of instructions. For example, the computing device may instruct a network device to transmit data to another computing device or the computing device may provide data over a display interface to present a user interface. In some example, performance of the method may be split across multiple computing devices.

At operation 402, in an example, a request to transfer assets may be received at a delivering system. The request may include an account identification of a user at the delivering system to transfer to a receiving system. At operation 404, transfer information based on the assets may be transmitted to the receiving system. The transfer information may include loan information associated with the assets. At operation 406, an identification of a location in a shared data ledger may be received that includes the transfer information.

At operation 408, in an example, the delivering system may verify that the transfer information is included at the location in the shared data ledger. Verifying may include decrypting information stored on the shared data ledger at the indicated location. The information may be decrypted using a key based on the an identification of the receiving system and delivering system.

At operation 410, in response to the verifying, a request may be transmitted to a transfer server to initiate transfer of the assets from the delivering system to the receiving system. The transfer system may be an ACAT system.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
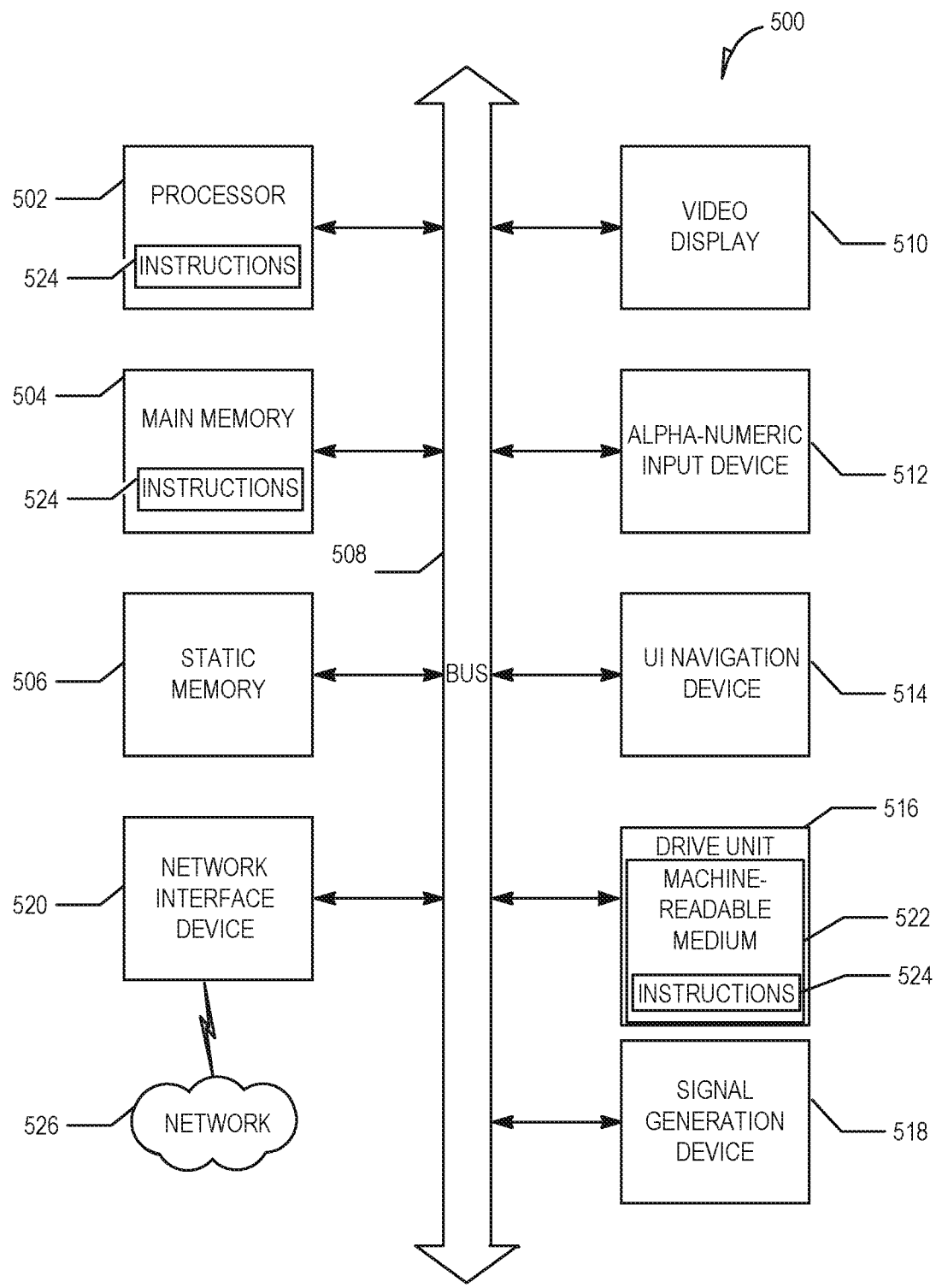
FIG. 5 is a block diagram illustrating an example machine upon which any one or more of the techniques (e.g., methodologies) discussed herein may be performed, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:

presenting, via a web server of a second financial institution, a user interface on a user device for an electronic request to transfer a financial account of a user from a first financial institution to the second financial institution, the user interface including an electronic form with fields for account identification information and assets;

receiving, from the user device over an application programming interface data entered into the electronic form, at a receiving system of the second financial institution;

based on the receiving, initiating an electronic communication session from the second financial institution to the first financial institution;

requesting, via the communication session, asset and loan details of the user associated with the account identification information;

receiving, via the communication session, the asset and loan details of the user associated with the account identification information;

based on the data entered into the electronic form and the asset and loan details received via the communication session, generating an electronic transaction record, the electronic transaction record identifying the user, the assets, and transfer information related to the assets, the assets including an equity asset and a loan asset wherein the equity asset is used as collateral for the loan asset;

selecting, at the second financial institution, a cryptographic key from a plurality of cryptographic keys based on an identity of the first financial institution and an identity of the second financial institution included in the transfer information;
encrypting the electronic transaction record using the cryptographic key;
adding the electronic transaction record encrypted using the cryptographic key to a shared ledger data structure of a private blockchain;
in response to the adding:
  transmitting an indication to a delivering system of the first financial institution that the electronic transaction record was added; and
  transmitting a notification to computing nodes associated with the shared ledger data structure that the shared ledger data structure was updated;
transmitting an account transfer request to an automated customer account transfer server, the account transfer request identifying the first financial institution and the second financial institution;
after transmitting the indication, receiving confirmation from the automated customer account transfer server that a database of broker-dealers was updated to the second financial institution for the financial account of the user; and
in response to the confirmation, updating an account database at the receiving system of the second financial institution indicating a transfer of the assets to the first financial institution.

2. The method of claim 1, wherein the shared ledger data structure is a blockchain data structure and wherein adding the electronic transaction record to a shared ledger data structure includes adding the electronic transaction record to a block of the private blockchain.

3. The method of claim 2, wherein the block includes a hash of previous blocks in the private blockchain.

4. The method of claim 2, where transmitting an indication to the delivering system that the electronic transaction record was added includes transmitting an identification of the block.

5. A non-transitory computer-readable medium comprising instructions, which when executed by at least one processor, configure the at least one processor to perform operations comprising:
  presenting, via a web server of a second financial institution, a user interface on a user device for an electronic request to transfer a financial account of a user from a first financial institution to the second financial institution, the user interface including an electronic form with fields for account identification information and assets;
  receiving, from the user device over an application programming interface data entered into the electronic form, at a receiving system of the second financial institution;
  based on the receiving, initiating an electronic communication session from the second financial institution to the first financial institution;
  requesting, via the communication session, asset and loan details of the user associated with the account identification information;
  receiving, via the communication session, the asset and loan details of the user associated with the account identification information;
  based on the data entered into the electronic form and the asset and loan details received via the communication session, generating an electronic transaction record, the electronic transaction record identifying the user, the assets, and transfer information related to the assets, the assets including an equity asset and a loan asset wherein the equity asset is used as collateral for the loan asset;
  selecting, at the second financial institution, a cryptographic key from a plurality of cryptographic keys based on an identity of the first financial institution and an identity of the second financial institution included in the transfer information;
  encrypting the electronic transaction record using the cryptographic key;
  adding the electronic transaction record encrypted using the cryptographic key to a shared ledger data structure of a private blockchain;
  in response to the adding:
    transmitting an indication to a delivering system of the first financial institution that the electronic transaction record was added; and
    transmitting a notification to computing nodes associated with the shared ledger data structure that the shared ledger data structure was updated;
  transmitting an account transfer request to an automated customer account transfer server, the account transfer request identifying the first financial institution and the second financial institution;
  after transmitting the indication, receiving confirmation from the automated customer account transfer server that a database of broker-dealers was updated to the second financial institution for the financial account of the user; and
  in response to the confirmation, updating an account database at the receiving system of the second financial institution indicating a transfer of the assets to the first financial institution.

6. The non-transitory computer-readable medium of claim 5, wherein the shared ledger data structure is a blockchain data structure and wherein adding the electronic transaction record to a shared ledger data structure includes adding the electronic transaction record to a block of the private blockchain.

7. The non-transitory computer-readable medium of claim 6, wherein the block includes a hash of previous blocks in the private blockchain.

8. The non-transitory computer-readable medium of claim 6, where transmitting an indication to the delivering system that the electronic transaction record was added includes transmitting an identification of the block.

9. A system comprising:
  at least one processor; and
  a storage device comprising instructions, which when executed by at least one processor, configure the at least one processor to perform operations comprising:
    presenting, via a web server of a second financial institution, a user interface on a user device for an electronic request to transfer a financial account of a user from a first financial institution to the second financial institution, the user interface including an electronic form with fields for account identification information and assets;
    receiving, from the user device over an application programming interface data entered into the electronic form, at a receiving system of the second financial institution;
    based on the receiving, initiating an electronic communication session from the second financial institution to the first financial institution;

requesting, via the communication session, asset and loan details of the user associated with the account identification information;

receiving, via the communication session, the asset and loan details of the user associated with the account identification information;

based on the data entered into the electronic form and the asset and loan details received via the communication session, generating an electronic transaction record, the electronic transaction record identifying the user, the assets, and transfer information related to the assets, the assets including an equity asset and a loan asset wherein the equity asset is used as collateral for the loan asset;

selecting, at the second financial institution, a cryptographic key from a plurality of cryptographic keys based on an identity of the first financial institution and an identity of the second financial institution included in the transfer information;

encrypting the electronic transaction record using the cryptographic key;

adding the electronic transaction record encrypted using the cryptographic key to a shared ledger data structure of a private blockchain;

in response to the adding:
- transmitting an indication to a delivering system of the first financial institution that the electronic transaction record was added; and
- transmitting a notification to computing nodes associated with the shared ledger data structure that the shared ledger data structure was updated;
- transmitting an account transfer request to an automated customer account transfer server, the account transfer request identifying the first financial institution and the second financial institution;
- after transmitting the indication, receiving confirmation from the automated customer account transfer server that a database of broker-dealers was updated to the second financial institution for the financial account of the user; and
- in response to the confirmation, updating an account database at the receiving system of the second financial institution indicating a transfer of the assets to the first financial institution.

10. The system of claim 9, wherein the shared ledger data structure is a blockchain data structure and wherein adding the electronic transaction record to a shared ledger data structure includes adding the electronic transaction record to a block of the private blockchain.

11. The system of claim 10, wherein the block includes a hash of previous blocks in the private blockchain.

12. The system of claim 10, where transmitting an indication to the delivering system that the electronic transaction record was added includes transmitting an identification of the block.

* * * * *